March 26, 1929.  J. WALKER  1,707,104

VEHICLE TIRE

Filed April 13, 1928

Joseph Walker INVENTOR

BY Victor J. Evans
ATTORNEY

Patented Mar. 26, 1929.

1,707,104

UNITED STATES PATENT OFFICE.

JOSEPH WALKER, OF CANONSBURG, PENNSYLVANIA.

VEHICLE TIRE.

Application filed April 13, 1928. Serial No. 269,748.

My present invention has reference to a combination tire for pneumatic wheels, that is, a tire that embodies a solid outer portion or shoe and an inner inflatable portion, which latter is secured directly on the rim of the vehicle wheel.

A further object is the provision of a tire of this type which is constructed to withstand rough use and at the same time afford the vehicle wheel, to which it is attached, the same yieldability as a pneumatic tire.

A still further object is the provision of a tire of this type in which novel means is provided for connecting the pneumatic element of the tire with the solid or shoe portion thereof.

To the attainment of the foregoing and other objects which will present themselves as the nature of the invention is better understood, the invention consists in the improvement as hereinafter described and definitely claimed.

Figure 1:
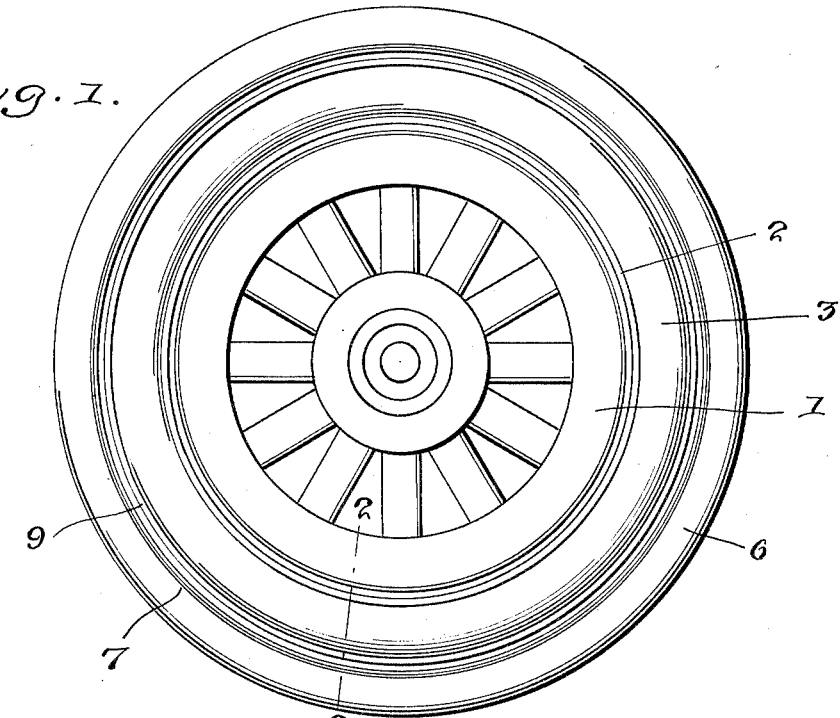
Figure 1 is a side elevation of a wheel equipped with a tire in accordance with this invention.
Figure 2:
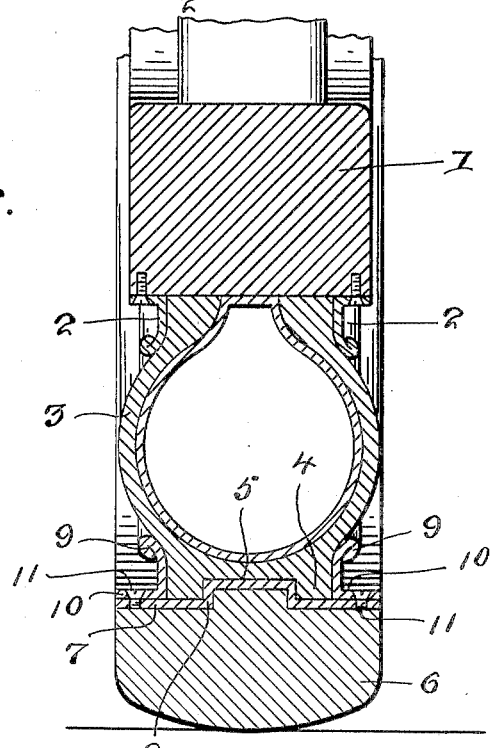
Figure 2 is an enlarged sectional view on the line 2—2 of Figure 1.

Referring now to the drawings in detail, the numeral 1 designates the rim of an ordinary vehicle wheel.

Removably secured on the outer periphery of the rim 1 there are the inner flanges of the ring clamps 2 for the casing 3 of the pneumatic tire. The outer or tread surface of this casing 3 is materially thickened, as at 4, and the same is centrally formed with an outer continuous groove or recess 5.

The outer vulcanized rubber member or shoe for the pneumatic tire is indicated by the numeral 6. In the process of molding there is secured on the inner periphery of the shoe 6 a metal plate 7 that has a central portion 8 substantially U-shaped in cross section which, of course, receives the central inner portion of the shoe therein and this portion 8 is designed to be received in the groove or recess 5 of the pneumatic tire casing 3. Arranged in contact with the rounded sides and straight edges at the thickened portion of the tire casing 3 there are ring clamps 9. Each of these clamps has an offset outwardly flanged portion 10 and these flanged portions are removably secured by means 11 to the metal reinforcing plate 7 for the shoe 6.

The metal ring plate 7 is preferably of steel as are the clamps for the pneumatic tire. The plate 7 affords what may be termed a buffer element between the vulcanized tire casing 3 and the vulcanized rubber shoe 6 as well as provides a protecting element for the tire casing 3 should the shoe be worn through. The construction is such that the metal plate as well as the ring clamps serves to protect the sides of the pneumatic tire casing and when the shoe is positioned the same is effectively held from circumferential creeping or from lateral movement with respect to the pneumatic tire. The improvement insures the long life of the tire regardless of the rough use to which it is subjected and its simplicity and advantages will, it is thought, be understood and appreciated by those skilled in the art without further detailed description.

Having described the invention, I claim:

A shoe for a pneumatic tire casing which has its tread surface centrally formed with a continuous groove, comprising a vulcanized ring whose outer tread surface is transversely rounded and whose inner face is cylindrical but centrally formed with an upstanding continuous rib, in combination with a steel plate molded on the inner face of the shoe having a central portion substantially U-shaped in cross section that receives the rib of the shoe therein and which U-shaped portion is designed to be received in the groove of the tire casing, said plate having clamps removably secured thereto and designed to contact with the sides of the tire casing opposite the groove therein.

In testimony whereof I affix my signature.

JOSEPH WALKER.